US010290165B2

(12) United States Patent
Farges et al.

(10) Patent No.: US 10,290,165 B2
(45) Date of Patent: May 14, 2019

(54) VEHICLE ENTRY DEVICE, AND VEHICLE TRIM COMPONENT EQUIPPED WITH SUCH DEVICE

(71) Applicant: DURA AUTOMOTIVE SYSTEMS SAS, Bievres (FR)

(72) Inventors: Thomas Farges, Gometz le Chatel (FR); Francis Delavigne, Ollainville (FR); Lionel Bitauld, Gif sur Yvette (FR); Joseph Bosnjak, Jouars Pontchartrain (FR)

(73) Assignee: DURA OPERATING, LLC, Auburn Hills, MI (US)

( * ) Notice: Subject to any disclaimer, the term of this patent is extended or adjusted under 35 U.S.C. 154(b) by 0 days.

(21) Appl. No.: 15/741,415

(22) PCT Filed: Sep. 30, 2015

(86) PCT No.: PCT/IB2015/001734
§ 371 (c)(1),
(2) Date: Jan. 2, 2018

(87) PCT Pub. No.: WO2017/055886
PCT Pub. Date: Apr. 6, 2017

(65) Prior Publication Data
US 2018/0374294 A1    Dec. 27, 2018

(51) Int. Cl.
*G07C 9/00* (2006.01)
*H01Q 1/32* (2006.01)
(Continued)

(52) U.S. Cl.
CPC ....... *G07C 9/00944* (2013.01); *H01Q 1/3241* (2013.01); *H01Q 7/06* (2013.01);
(Continued)

(58) Field of Classification Search
CPC ...... G07C 9/00944; G07C 2009/00968; H01Q 1/3241; H01Q 7/06; H01Q 1/3291; H04B 5/0025
(Continued)

(56) References Cited

U.S. PATENT DOCUMENTS

| 2012/0032463 A1* | 2/2012 | Gerndorf ............ B60R 11/0235 296/1.08 |
| 2013/0130674 A1* | 5/2013 | De Wind ............. B60Q 1/2619 455/420 |

(Continued)

FOREIGN PATENT DOCUMENTS

| DE | 102013102701 A1 | 9/2014 |
| FR | 3013069 A1 | 5/2015 |
| WO | WO2015168459 A1 | 11/2015 |

OTHER PUBLICATIONS

NXP, Mobile Knowledge, "NFC Reader Design: Antenna design considerations Public", XP055279103, http://www.themobileknowledge.com/content/nfc-reader-design-ii-antenna-designs-considerations, dated Mar. 18, 2015, 46 pages.

(Continued)

*Primary Examiner* — Edwin C Holloway, III
(74) *Attorney, Agent, or Firm* — Reising Ethington P.C.

(57) ABSTRACT

A vehicle entry device is designed to equip a vehicle and may include: a housing defining a cavity and adapted to be fixed to the vehicle; and an electronics module disposed in the cavity, including: a printed circuit board; an antenna connected to the printed circuit board and configured to capture a NFC signal, wherein the antenna includes windings directly arranged on the printed circuit board; an NFC receiver connected to the printed circuit board, in communication with the antenna and configured to receive the NFC signal from the antenna; and a processing element connected to the printed circuit board, in communication with the NFC (Continued)

receiver and configured to provide a control signal to a control system equipping the vehicle, based on the NFC signal transmitted by the NFC receiver, said control signal allowing access to the vehicle. A vehicle trim component may be equipped with such vehicle entry device.

21 Claims, 4 Drawing Sheets

(51) Int. Cl.
    *H01Q 7/06*     (2006.01)
    *H04B 5/00*     (2006.01)

(52) U.S. Cl.
    CPC ............. *H04B 5/00* (2013.01); *H04B 5/0025* (2013.01); *H04B 5/0056* (2013.01); *H04B 5/0081* (2013.01); *G07C 2009/00968* (2013.01); *G07C 2209/64* (2013.01)

(58) Field of Classification Search
    USPC ..................................... 340/5.61, 5.72, 12.55
    See application file for complete search history.

(56) References Cited

U.S. PATENT DOCUMENTS

| | | | |
|---|---|---|---|
| 2013/0244577 A1* | 9/2013 | Cheikh | G07C 9/00309 455/41.1 |
| 2013/0341414 A1* | 12/2013 | Ziller | G07C 9/00944 235/492 |
| 2017/0050616 A1* | 2/2017 | Liubakka | G07C 9/00309 |

OTHER PUBLICATIONS

Written Opinion & International Search Report for PCT/IB2015/001734 dated Jun. 23, 2016, 13 pages.

* cited by examiner

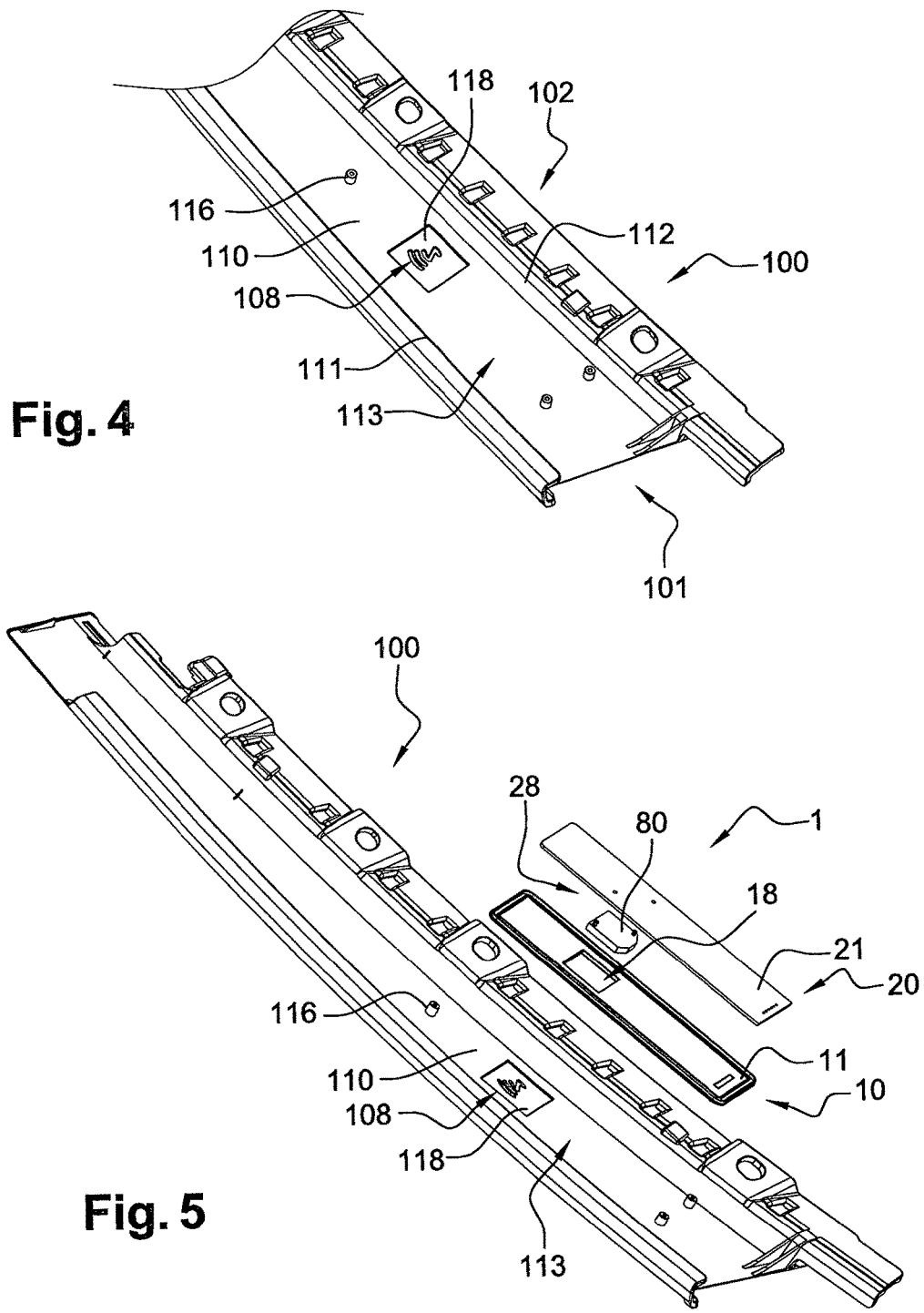

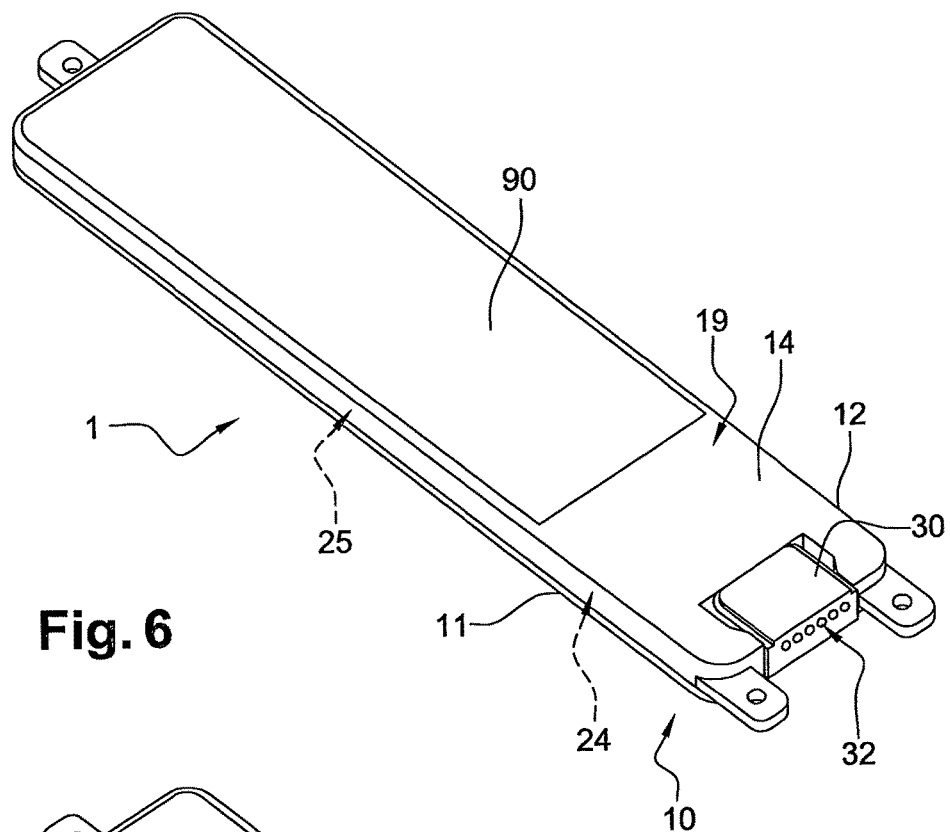
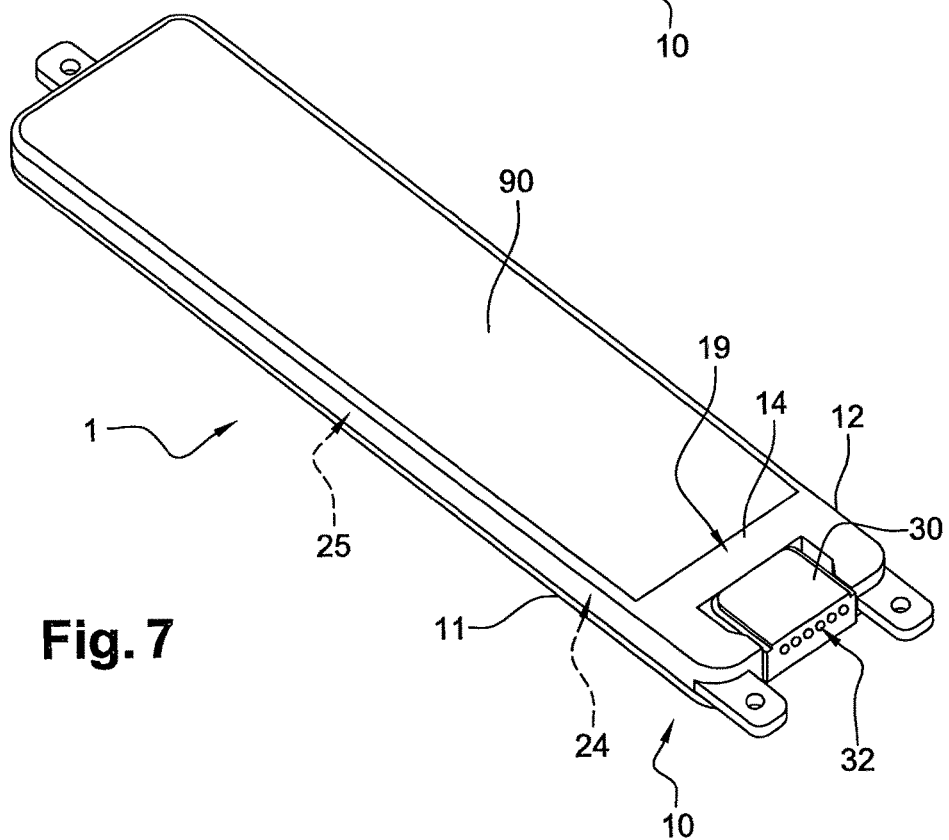

VEHICLE ENTRY DEVICE, AND VEHICLE TRIM COMPONENT EQUIPPED WITH SUCH DEVICE

TECHNICAL FIELD OF THE INVENTION

The invention concerns a vehicle entry device, designed to equip a vehicle and allow access to the vehicle upon reception of a NFC signal (Near Field Communication signal). The invention also concerns a vehicle trim component equipped with such device.

BACKGROUND OF THE INVENTION

In a known manner, a vehicle comprises at least one door provided with a vehicle entry device including a lock. A key is inserted into the lock to unlock the latter, open the door and enter the vehicle.

Alternately or additionally, a vehicle can be provided with a vehicle entry device including an electronic lock actuated by an electronic key.

WO 2010 115 585 discloses an example of vehicle entry device, comprising a housing and a keypad. The device is integrated to a trim component of an automotive vehicle.

U.S. Pat. No. 2,013,130 674 discloses another example of vehicle entry device, comprising an illumination system. The device is integrated to a door handle assembly of an automotive vehicle.

U.S. Pat. No. 2,013,341 414 discloses another example of vehicle entry device, comprising numerous components mounted on a PCB (printed circuit board). Those components include a LF 3D coil assembly, a NFC chip card mount for receiving a NFC chip card, a power supply cell mounted on a bracket, an antenna sub-assembly, a controller, an oscillating crystal and a transceiver. The antenna comprises a flexible film and conductor tracks carried by the film. Some components are mounted on the front face of the PCB, while some other components including the antenna are mounted on the back face of the PCB. Such vehicle entry device has a complex, cumbersome and expensive construction.

SUMMARY OF THE INVENTION

The aim of the invention is to provide an improved vehicle entry device.

To this end, the invention concerns a vehicle entry device, designed to equip a vehicle and comprising:
a housing defining a cavity and adapted to be fixed to the vehicle; and
an electronics module disposed in the cavity, including:
a printed circuit board;
an antenna connected to the printed circuit board and configured to capture a NFC signal, wherein the antenna includes windings directly arranged on the printed circuit board;
a NFC receiver connected to the printed circuit board, in communication with the antenna and configured to receive the NFC signal from the antenna; and
a processing element connected to the printed circuit board, in communication with the NFC receiver and configured to provide a control signal to a control system equipping the vehicle, based on the NFC signal transmitted by the NFC receiver, said control signal allowing access to the vehicle.

Thanks to the invention, the vehicle entry device has a simple, inexpensive and efficient construction. The vehicle entry device is compact and practical to install in the vehicle. In particular, the vehicle entry device is practical to connect to the control system equipping the vehicle. Furthermore, the vehicle entry device is practical to operate, with an electronic key or preferably a personal communication device (such as a smartphone) handled by a vehicle user. Design of the antenna and NFC tuning of the electronics module are optimized for efficiency at close range.

According to further aspects of the invention which are advantageous but not compulsory, such a vehicle entry device may incorporate one or several of the following features:
  The processing element and the NFC receiver are connected to a first side portion of the printed circuit board, while the antenna is connected to a second side portion of the printed circuit board opposite the first side portion.
  The antenna does not surround the processing element.
  The housing has a front part and a rear part defining the cavity for receiving the electronics module.
  The front part is a transparent cover.
  The front part and the rear part are assembled by laser welding, thus sealing the housing.
  The antenna is positioned closer to the front part than to the rear part.
  The antenna includes three windings.
  The antenna has an overall rectangular shape.
  The NFC receiver includes a capacitor and an EMC filter.
  The processing element, the NFC receiver and the antenna are connected to a same face of the printed circuit board.
  The vehicle entry device further comprises an electrical connector connected to the printed circuit board and extending through the housing for connection of the electronics module to the control system equipping the vehicle.
  The electronics module further comprises a light source connected to the printed circuit board and in communication with the NFC receiver, and wherein the light source emits light through a transparent or translucent portion of the housing when the NFC receiver receives the NFC signal from the antenna.
  The vehicle entry device further comprises a light guide positioned between the light source and the transparent or translucent portion of the housing.
  The antenna surrounds the light source.
  The vehicle entry device further comprises a ferrite sheet disposed on a rear outer surface of the housing.
  The ferrite sheet covers an area of the rear outer surface of the housing corresponding to an area covered by the antenna inside the housing.
  The ferrite sheet covers an area of the outer surface of the housing larger than an area covered by the antenna inside the housing.
  The ferrite sheet is disposed opposite the processing element, the NFC receiver and the antenna in relation with the printed circuit board.
  The ferrite sheet is attached to the housing by an adhesive.
  The housing has a rear part including a plurality of mounting members for attachment to the vehicle.

The invention also concerns a vehicle trim component equipped with a vehicle entry device as mentioned hereabove. The housing of the vehicle entry device is attached to a mounting surface of the vehicle trim component.

According to further aspects of the invention which are advantageous but not compulsory, such a vehicle trim component may incorporate one or several of the following features:

- The vehicle trim component is a vehicle pillar member and the housing of the vehicle entry device is attached to a mounting surface of a pillar capping.
- A seal member is disposed between the mounting surface of the vehicle trim component and the housing of the vehicle entry device.
- The vehicle trim component is provided with a marking visible from outside the vehicle. The electronics module of the vehicle entry device comprises a light source connected to the printed circuit board and in communication with the NFC receiver. The light source emits light through a transparent or translucent portion of the housing and backlights the marking when the NFC receiver receives the NFC signal from the antenna.
- The marking is a logo corresponding to the vehicle type.

BRIEF DESCRIPTION OF THE DRAWINGS

The invention will now be explained in correspondence with the annexed figures, and as an illustrative example, without restricting the object of the invention. In the annexed figures:

FIG. 4 is a partial perspective view of a vehicle trim component, destined to receive the vehicle entry device, from a rear direction;

FIG. 5 is another perspective view of the vehicle trim component of FIG. 4, receiving the vehicle entry device;

FIG. 6 is another perspective view of the vehicle entry device, from a rear direction; and FIG. 7 is a perspective view similar to FIG. 6, of a vehicle entry device according to a second embodiment of the invention.

DETAILED DESCRIPTION OF SOME EMBODIMENTS

Figure 1:
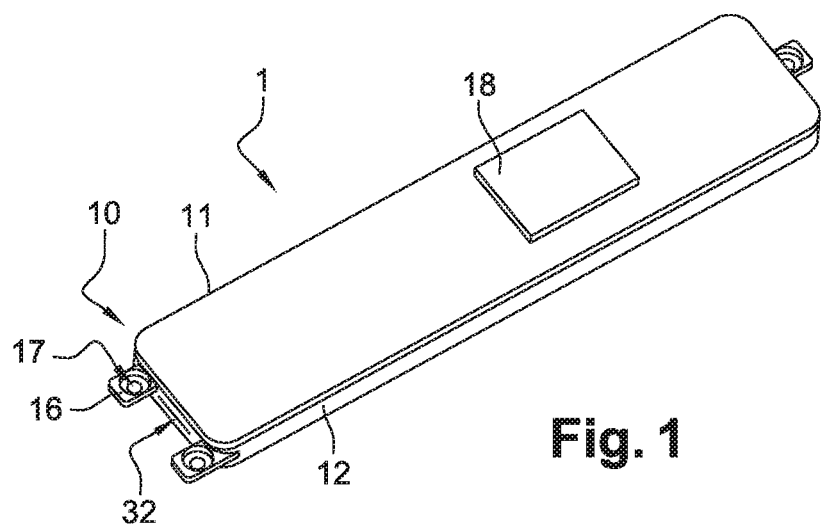
FIG. 1 is a perspective view of a vehicle entry device according to the invention, designed to equip a vehicle trim component.
Figure 2:
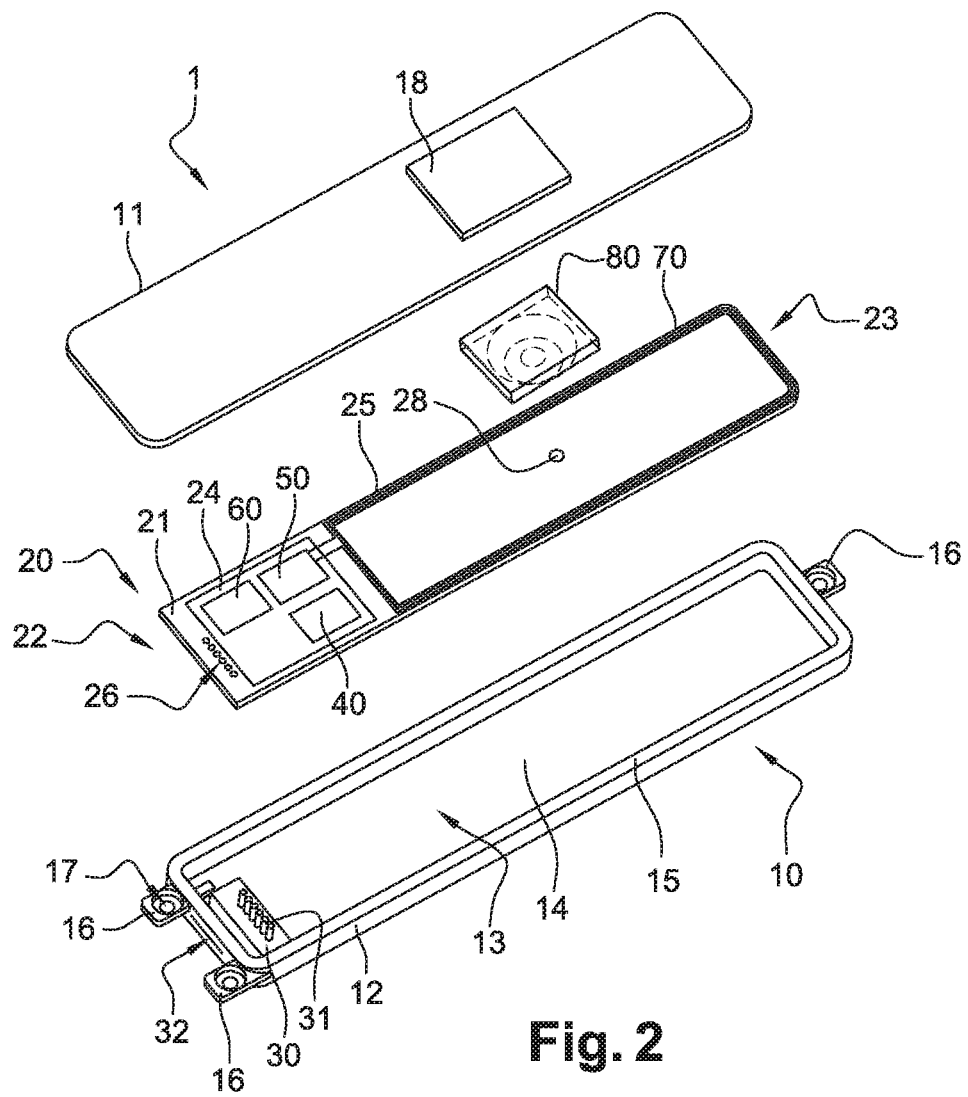
FIG. 2 is an exploded perspective view of the vehicle entry device, comprising front and rear housing parts, an electronics module and a light guide.
Figure 3:
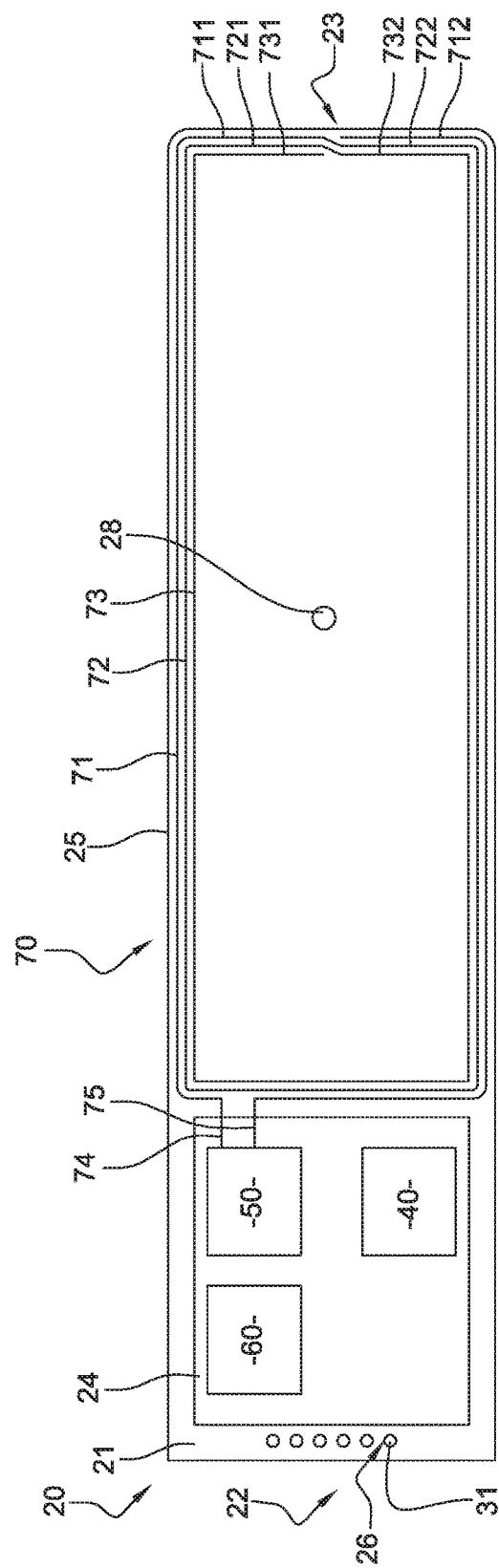
FIG. 3 is a front view of the electronics module, at a larger scale.

FIGS. 1 to 6 show a vehicle entry device 1 and a vehicle trim component 100 according to the invention, designed to equip a vehicle, in particular an automotive vehicle.

Device 1 comprises a housing 10, an electronics module 20, an electrical connector 30, a light guide 80 and a ferrite sheet 90. Device 1 is designed to equip component 100.

Housing 10 has an elongated rectangular shape. Housing 10 comprises a front part 11 and a rear part 12 defining an inner cavity 13. Parts 11 and 12 can be joined by laser welding after elements 20, 30 and 80 have been positioned into cavity 13, so that housing 10 is sealed.

Front part 11 is a transparent cover, thus providing two benefits: ease the assembly of housing 10 by laser welding, and allow light transmission from a light source 28 equipping electronics module 20 to outside housing 10. Alternately, front part 11 may be a translucent cover instead of a transparent one. Front part 11 is provided with a protruding hollow portion 18 for receiving light guide 80 in alignment with light source 28. In alternative embodiments, at least portion 18 of housing 10 is transparent or translucent to allow light transmission.

Rear part 12 has a bottom wall 14 and lateral walls 15. Rear part 12 has longitudinal ends provided with a plurality of mounting members 16. In the embodiment shown on the figures, mounting members protrude from end walls 15 along longitudinal direction of housing 10 and are provided with screw holes 17.

Housing 10, more particularly its rear part 12 provided with mounting members 16, is designed to be fixed to component 100.

Module 20 comprises a PCB 21 (printed circuit board), having conductors not shown formed on its surface. PCB 21 is double sided, with two external layers and two internal layers. Alternately, PCB 21 may be single sided. PCB 21 has a rectangular shape extending between opposite longitudinal ends 22 and 23. PCB 21 is designed to be fitted in cavity 13 of housing 10, while being connected to connector 30.

A first side portion 24 of PCB 21 located near end 22 is provided with several electronic components connected to PCB 21, while a second side portion 25 of PCB 21 located near end 23 is provided with light source 28 and an antenna 70 connected to PCB 21. Side portion 24 is smaller than side portion 25.

Side portion 24 is provided with a microprocessor 40, a capacitor 50 and an EMC filter 60. Side portion 24 may have several additional passive or active components mounted thereto, not shown and not described for simplification purpose. As a non-limitative example, those additional components may include a power cell for supplying light source 28 and other components with energy.

Side portion 24 is provided with a row of holes 26 near end 22, for connection of module 20 to connector 30.

Connector 30 comprises a body provided with upward protruding pins 31 and a lateral protruding portion 32. Connector 30 can be advantageously overmolded into rear part 12 of housing 10. Pins 31 are press-fitted into holes 26 for connecting PCB 21 to connector 30. Portion 32 extends through an end wall 15 of housing 10, between cavity 13 and outside of housing 10, for connection of connector 30 to the control system equipping the vehicle. Thus, module 20 can be easily connected to said control system.

In practice, antenna 70 is configured to capture a specific NFC signal, sent for example by an electronic key or a personal communication device, handled by the vehicle user. Capacitor 50 and EMC filter 60 constitute a NFC receiver 50+60 in communication with light source 28 and antenna 70 via PCB 21. NFC receiver 50+60 is designed to receive the NFC signal captured by antenna 70. Microprocessor 40 constitutes a processing element, also in communication with NFC receiver 50+60 via PCB 21. Microprocessor 40 is configured to selectively provide a control signal to the control system equipping the vehicle, based on the NFC signal received from NFC receiver 50+60.

Upon reception of control signal from device 1, said control system allows the vehicle user to access the vehicle, by unlocking one or several doors of the vehicle.

Antenna 70 has an overall rectangular shape, for example of 30 millimeters by 100 millimeters. Antenna 70 is positioned closer to front part 11 than to rear part 12 of housing 10, to facilitate the capture of the NFC signal. Antenna 70 does not surround electronic elements 40, 50 and 60, so that they do not have to withstand the electromagnetic field generated by antenna 70, thus avoiding disturbance.

Antenna 70 is made of two wires defining three turns or windings 71, 72 and 73, each having an overall rectangular shape and being directly arranged on PCB 21. Winding 71 is made of two sections 711 and 712, winding 72 is made of two sections 721 and 722, and winding 73 is made of two sections 731 and 732. Near end 23, sections 711 and 722 shift and are linked to each other, and similarly sections 721 and 732 shift and are linked to each other. Sections 711, 721, 722, 731 and 732 belong to the same wire, while only section 712 belongs to another wire.

Winding 71 is connected via sections 74 and 75 to capacitor 50 for tuning antenna 70. More precisely, section 74 is an extension of section 711, while section 75 is an extension of section 712. Thus, NFC receiver 50+60 is in direct and close communication with antenna 70. Optimized design of antenna 70, including size and number of windings 71, 72 and 73, associated with its tuning to NFC receiver 50+60, allows antenna 70 to be routed on PCB 21 with the rest of electronic components, with performances similar to those of a larger antenna. For example, antenna has an inductance of 1.69 pH.

Advantageously, microprocessor 40, capacitor 50, EMC filter 60 and antenna 70 are all connected to the front face of PCB 21. Moreover, light guide 80 is also positioned on the front face of PCB 21. Thus, device 1 is more compact in depth, which further facilitates its integration to the vehicle.

Light guide 80 is positioned between light source 28 and portion 18 of housing 10. Alternately, device 1 can be devoid of light guide 80. Light source 28 and light guide 80 are positioned in the middle of tracks 71, 72 and 73. Antenna 70 surrounds light source 28 and partly light guide 80.

Device 1 is integrated to vehicle trim component 100, with housing 10 attached to a mounting surface of said component 100. Preferably, component 100 is a pillar member and housing 10 is attached to a mounting surface of a pillar capping. A seal member may be disposed between housing 10 and the mounting surface component 100.

WO 2010 115 585 discloses an example of vehicle trim component provided with a vehicle entry device. Such trim component may be equipped with device 1 according to the invention.

FIGS. 4 and 5 show an example of vehicle trim component 100 for a vehicle door, designed to accommodate device 1. For simplification purpose, device 1 is partly shown on FIG. 5, without connector 30 and rear part 12 of housing 10.

Component 100 is a pillar member having a front side 101 and a rear side 102. On FIGS. 4 and 5, component 100 is shown from its rear side 102. Component 100 comprises a pillar capping 110 provided with two lateral borders 111 and 112. Together, capping 110 and borders 111 and 112 define a cavity 113 provided with mounting elements 116 for receiving device 1

A portion 118 of capping 110 is provided with a marking visible from outside the vehicle. Preferably, this marking is a logo 108 corresponding to the vehicle type. Portion 118 of capping 110 is designed to accommodate portion 18 of housing 10. Light guide 80 has dimensions superior or equal to logo 108.

Light source 28 emits light through light guide 80, then portion 18 of housing 10, then portion 118 of capping 110, when NFC receiver 50+60 of module 20 receives the NFC signal from antenna 70. Thus, logo 108 is illuminated when light source 28 backlights portion 118, allowing the vehicle user to notice operation of device 1.

Capping 110 can be formed of a single layer integrating portion 118. However, preferably, capping 110 is formed of two layers of two different materials, including an opaque layer and a transparent or translucent layer. Logo 108 can be formed on portion 118 with a specific arrangement of injection tool, such that portion 118 has an opaque area and a transparent area forming logo 108. Therefore, from outside the vehicle, the opaque area of portion 118 has exactly the same aspect as the remaining surface of capping 100, result that is not possible to obtain by using an adhesive logo applied on the internal surface of a transparent layer.

The transparent or translucent layer can be made of smoked transparent material, as in sunglasses, such that logo 108 is almost invisible when not illuminated by light source 28.

As shown on FIG. 6, ferrite sheet 90 is fixed to an outer surface 19 of bottom wall 14, belonging to rear part 12 of housing 10. Ferrite sheet 90 can be a plate or film. Ferrite sheet 90 can be attached to wall 14 of housing 10 by any suitable means, but preferably by an adhesive. Alternately, ferrite sheet 90 can be overmolded into wall 14 of housing 10. Ferrite sheet 90 covers an area of the outer surface 19 corresponding to the area covered by antenna 70 inside housing 10. Ferrite sheet 90 is disposed opposite microprocessor 40, NFC receiver 50+60 and antenna 70 in relation with PCB 21.

As NFC is a short range radio frequency identification system, device 1 and particularly antenna 70 need to be integrated as close as possible to the outer part of the vehicle body. Vehicle bodies are frequently made of metal or include metal components, absorbing the electromagnetic field. Thanks to the ferrite sheet 90, electromagnetic field absorption can be reduced, thus improving the efficiency of device 1.

FIG. 7 shows a vehicle entry device 1 according to a second embodiment of the invention. In this embodiment, elements similar to the first embodiment have the same references and work in the same way. In FIG. 7, ferrite sheet 90 covers an area of outer surface 19 of housing 10 which is larger than the area covered by antenna 70 inside housing 10. Electromagnetic field absorption is further reduced, thus further improving the efficiency of device 1.

Other non-shown embodiments can be implemented within the scope of the invention. In addition, technical features of the different embodiments can be, in whole or part, combined with each other. Thus, the vehicle entry device 1 can be adapted to the specific requirements of the application.

The invention claimed is:
1. A vehicle entry device, comprising:
a pillar capping that includes two layers of two different materials including an opaque layer and a transparent or translucent layer;
and wherein the vehicle entry device includes:
a housing defining a cavity; and
an electronics module disposed in the cavity, including:
a) a printed circuit board;
b) an antenna connected to the printed circuit board and configured to capture a NFC signal, wherein the antenna includes windings directly arranged on the printed circuit board;
c) a NFC receiver connected to the printed circuit board, in communication with the antenna and configured to receive the NFC signal from the antenna;
d) a processing element connected to the printed circuit board, in communication with the NFC receiver and configured to provide a control signal to a control system equipping the vehicle, based on the NFC signal transmitted by the NFC receiver, said control signal allowing access to the vehicle;

e) a light source connected to the printed circuit board and in communication with the NFC receiver, and f) a light guide positioned before the light source, wherein the housing of the vehicle entry device is attached to a mounting surface of the pillar capping, and wherein an illumination portion of the pillar capping has a transparent or translucent area which is formed by the transparent or translucent layer and is devoid of the opaque layer, and wherein the light source emits light through the light guide of the vehicle entry device, then through the illumination portion of the pillar capping, when the NFC receiver receives the NFC signal from the antenna.

2. The vehicle entry device according to claim 1, wherein the processing element and the NFC receiver are connected to a first side portion of the printed circuit board, while the antenna is connected to a second side portion of the printed circuit board opposite the first side portion.

3. The vehicle entry device according to claim 1, wherein the processing element, the NFC receiver and the antenna are connected to a same face of the printed circuit board.

4. The vehicle entry device according to claim 1, wherein the antenna does not surround the processing element.

5. The vehicle entry device according to claim 1, wherein the housing has a front part and a rear part defining the cavity for receiving the electronics module, the rear part being designed to be fixed to the pillar capping.

6. The vehicle entry device according to claim 5, wherein the front part is a transparent cover.

7. The vehicle entry device according to claim 1, wherein the antenna includes three windings.

8. The vehicle entry device according to claim 1, wherein the NFC receiver includes a capacitor and an EMC filter.

9. The vehicle entry device according to claim 1, wherein the antenna surrounds the light source.

10. The vehicle entry device according to claim 1, further comprising a ferrite sheet disposed on a rear outer surface of the housing.

11. The vehicle entry device according to claim 10, wherein the ferrite sheet covers an area of the rear outer surface of the housing corresponding to an area covered by the antenna inside the housing.

12. The vehicle entry device according to claim 10, wherein the ferrite sheet covers an area of the rear outer surface of the housing larger than an area covered by the antenna inside the housing.

13. The vehicle entry device according to claim 10, wherein the ferrite sheet is disposed opposite the processing element, the NFC receiver and the antenna in relation with the printed circuit board.

14. The vehicle entry device according to claim 10, wherein the ferrite sheet is attached to the housing by an adhesive.

15. The vehicle entry device according to claim 1, wherein a seal member is disposed between the mounting surface of the vehicle trim component pillar capping and the housing of the vehicle entry device.

16. The vehicle entry device according to claim 1, wherein the pillar capping is provided with a marking visible from outside the vehicle, and-wherein the light source backlights the marking when the NFC receiver receives the NFC signal from the antenna.

17. The vehicle entry device according to claim 1, wherein at least a portion of the housing is transparent or translucent to allow light transmission therethrough.

18. The vehicle entry device according to claim 17, wherein the light guide is a separate element positioned between the light source and the transparent or translucent portion of the housing.

19. The vehicle entry device according to claim 17, wherein the light guide is formed by the transparent or translucent portion of the housing.

20. The vehicle entry device according to claim 16, wherein the marking is a transparent area located within an opaque area.

21. The vehicle entry device according to claim 20, wherein the pillar capping has a front side and a rear side, and the mounting surface is at least part of the rear side, and, at the front side, the opaque area in which the marking is located has exactly the same aspect as the remaining surface of the pillar capping.

* * * * *